Dec. 17, 1935.   P. L. JOSLYN   2,024,929
CARBURETOR FOR INTERNAL COMBUSTION ENGINES
Filed May 8, 1934

INVENTOR.
PAUL L. JOSLYN
BY *Victor J. Evans & Co*
ATTORNEYS.

Patented Dec. 17, 1935

2,024,929

UNITED STATES PATENT OFFICE 2,024,929

CARBURETOR FOR INTERNAL COMBUSTION ENGINES

Paul L. Joslyn, San Francisco, Calif.

Application May 8, 1934, Serial No. 724,569

1 Claim. (Cl. 261—79)

This invention relates to improvements in internal combustion engines and has particular reference to that type of engine which admits the charge to the cylinders, through a carburetor system which mixes the air and fuel to be later ignited by an electric spark.

A further object is to produce a device which may be attached to the ordinary internal combustion engine, without materially altering its construction.

A still further object is to produce a device which is economical to manufacture and install, and further a device which will reduce the cost of fuel through enabling the employment of a lower grade of fuel.

Other objects and advantages will be apparent during the course of the following description.

Figure 1:
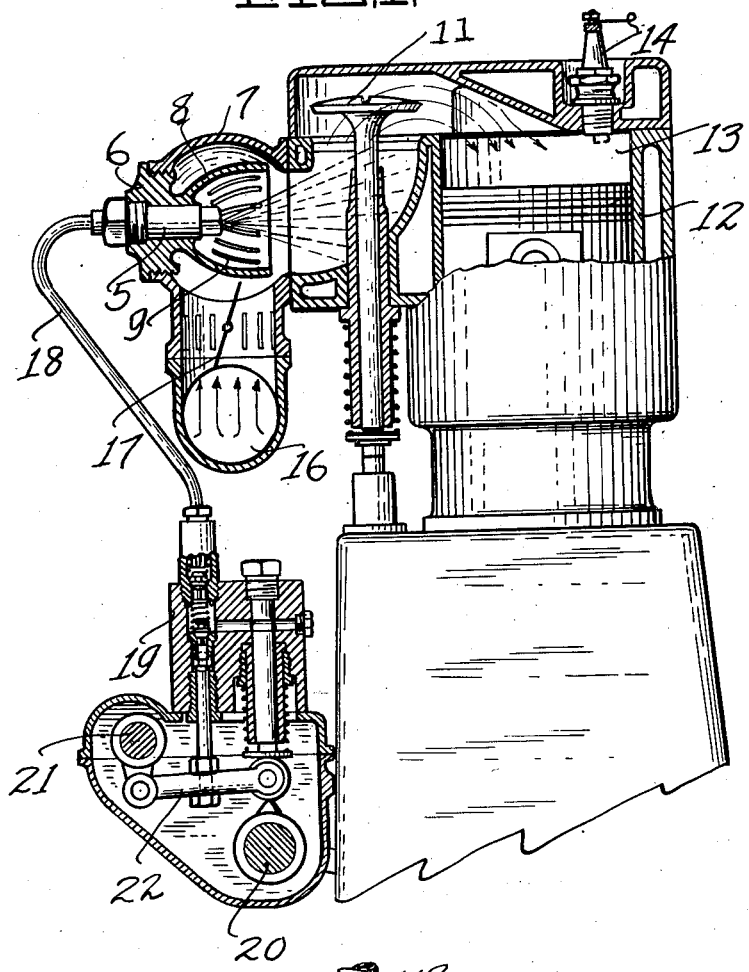
Figure 2:
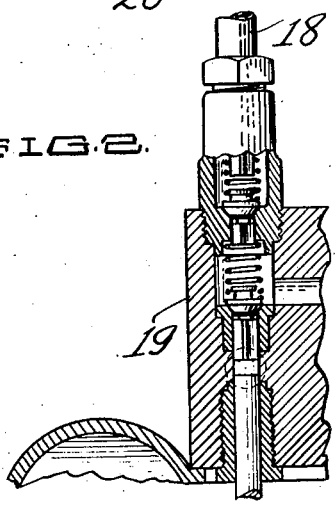

In the accompanying drawing forming a part of this specification and in which like numerals are employed to designate like parts throughout the same, Fig. 1 is a side elevation of an engine having a portion thereof broken away and having my invention applied thereto, and Fig. 2 is an enlarged fragmentary detail view of the valve arrangement of the fuel line.

In an ordinary internal combustion engine, a carburetor is employed which mixes the air and gas and delivers the same to a manifold, from which manifold the carburetor mixture is delivered to the various cylinders. Usually there is provided with the carburetor two elements of control, that of the air and that of the fuel. The regulation of the air is attained by a butterfly valve fitted in the main branch of the intake manifold. When the butterfly valve is put in a closed position the free passage of air into the manifold is choked, limiting the admission of air to the cylinder, and depending how far this valve is kept open a larger or smaller amount of air is admitted to the engine. The fuel oil is regulated in the carburetor proper, by uncovering openings provided, through which the fuel is permitted to flow out in a larger or smaller quantity, as desired, into the air space and there to be picked up by the inrush of air to the intake manifold and from there in a mixture form to penetrate to the cylinders.

The carburetor is brought into action primarily by the vacuum created in the cylinder during the intake stroke of the engine. As the carburetor is connected to the engine by means of the intake manifold, with branches leading to the individual intake valves of each cylinder and through these valves is connected with the interior of the cylinder; the carburetor will be actuated only when the mixture in the intake manifold is drawn in by the piston on its downward stroke. The carburetor under these conditions will come into action only over a smaller portion of the stroke. Furthermore, as is the case of a multiple cylinder engine, there are different lengths of branches leading from the carburetor, to the various cylinders, which construction results in a further delayed period of action of the carburetor, particularly for the cylinders that have longer branches, effecting an unequal distribution of the charging mixture to each of the cylinders. With a variable charge delivered to the cylinders, there will result an overcharging of some of the cylinders, and a consequent poorer thermal efficiency and loss of power.

It is a recognized fact that the carburetor type of engines have a much higher fuel oil consumption than other types of internal combustion engines that utilize a different method of fuel injection, such as for instance the Diesel types.

The carburetor, being actuated by the vacuum created in the cylinder during the intake stroke, is subject to great fluctuation in its efficient action, in proportion as the height of the vacuum varies, due to loss of tightness of piston rings, valves, wear and other conditions that usually exist in the operation of this class of engines. Since there is no provision of a mechanical nature that permits compensation, the carburetor is classed as a type of regulator that permits only indifferent governing. It is not a precision apparatus as is usually found and that has been developed for other types of internal combustion engines, whereby the fuel is controlled by mechanical means and a very accurate and a wide range of control is obtained. These factors contribute to the low efficiency of the carburetor engines and cause high fuel consumption.

This invention relates to and has the purpose of modifying the system of carburetion to the extent that it eliminates the objectionable features at present existing. By the provision of a pressure and mechanical means of precision fuel control an increase in the thermal efficiency of the engine is realized together with a reduced fuel consumption. One of the main points in the invention is to segregate the control of air and gasoline. The introduction of air to the cylinders of the engine is left to the action of vacuum during the intake stroke, the admission of the fuel is made by mechanical means and mechanical control.

The principle of carburetion, that is the mixing of the fuel oil with air, outside of the combustion chamber of the cylinder and the admission of the mixture to the cylinder, is left intact, as before.

The invention primarily consists of a gasoline pump, mechanically operated, which is timed and is capable of delivering a variable quantity of fuel under pressure to the spray nozzle. Each cylinder is provided with an individual nozzle fitted in the intake manifold adjacent to and directly in line with the chamber of the intake valve. The spray nozzle is constructed in a manner to actuate same at a predetermined pressure, and is adjusted to open only at such times when this pressure has been reached. As the pump builds up the required pressure, the spray nozzle is opened and is kept open as long as the pressure is maintained by the pump, permitting ejection of fuel through the nozzle. The pump is designed to maintain pressure any desired length of time within the limits of the intake stroke, so that a smaller or larger amount of fuel is ejected from the nozzle and admitted to the cylinders. The spray nozzle while ejecting the fuel breaks up the same into a finely atomized jet, of conical form and of sufficient size to just fill the diameter of the intake valve chamber. As the valve is opened during the intake stroke, and a vacuum is created in the cylinder, air is drawn in through the intake manifold and as it passes through the intake valve chamber it also passes through the issuing jet of fuel and is mixed thoroughly with the same and reaches the cylinder as a highly combustible vapor. As regulation is provided for the control of amounts of air admitted to the cylinder as well as the amount of fuel, any degree of richness of mixture is obtained and with it the efficient regulation of the power and speed of the engine.

The fact that the fuel is finely atomized and introduced closely to the intake valve chamber, and also that the air is caused to pass through the issuing jet of fuel, assures an efficient mixture. Furthermore, as each cylinder is fitted with an individual nozzle, each cylinder will receive exactly the same amount and the same quality mixture. The thermal efficiency of the engine will show appreciably higher value than is possible with the existing types of carburetors. As a consequence the engine will deliver more power with the same amount of fuel consumed, have a better and more uniform torque and will operate smoother and with less vibration. Due to wide range of fuel and air control obtainable with the new system, an action of the engine is possible that will approach the control obtainable with the steam engine. This would mean an operation of the engine which would dispense the use of shifting gears to a great extent.

In the acompanying drawing wherein for the purpose of illustration is shown a preferred embodiment of my invention, the spray nozzle 5 is secured to a casting 6, threadedly secured in the intake manifold 7. This casting 6 has a flared bell-shaped extension 8 which also projects into the manifold and has openings 9 formed therethrough. The intake valve of the engine is shown at 11, the piston at 12 and the cylinder at 13. The customary spark plug 14 is employed to ignite the charge. Air is admitted to the manifold through an intake pipe 16 and is regulated by a butterfly valve 17. Fuel is delivered to the nozzle 5 through the medium of a pipe 18 connected to a pump designated as a whole by the numeral 19. As the pump forms no part of my invention, reference thereto will be eliminated other than to say the same is actuated by the customary cam shaft 20 of the engine and that the stroke of the pump may be regulated by the actuation of a shaft 21, which will move a rocker arm 22 in a manner which is obvious. Valves, positioned between the pump and the nozzle, control the flow of fuel from the pump to the nozzle. These valves are shown in Fig. 2. A pressure valve is also positioned in the nozzle, the same being normally closed, and opens only when the pressure in the fuel line exceeds a pre-determined amount. This last mentioned valve prevents any dripping of the nozzle and assures a finely atomized spray when the fuel is ejected from the nozzle.

The result of this construction is that when fuel is pumped from the pump 19 through the line 18, past the valve in the nozzle 5, the same will be sprayed from the nozzle as indicated in broken lines of Fig. 1. This spraying action is so timed as to take place during the intake stroke of the cylinder into which the nozzle is ejecting and while the intake valve is open. Also depending upon the quantity of fuel to be delivered to the cylinder, as for instance, whether a rich or poor mixture is required, the pump can be regulated so as to begin the ejection at any period of the intake stroke and to also close during any interval of this time. As the spray from the nozzle occurs and the suction of the air entering the intake 16, the result will be that this air entering will pass upwardly into the manifold and due to its globular shape will whirl about the bell-shaped portion 8 and into the same through the slots 9. These slots are angularly disposed so as to give a rotation of the air in a direction opposite to the rotation set up in the spray and generated by the bell nozzle. As the extremity of the bell approaches the manifold there will also be a Venturi effect which will further assist in mixing the air and the fuel.

As a result of this construction, it will be apparent that each cylinder will receive identically the same amount of fuel, properly atomized and delivered to the cylinder, at the proper time. In actual practice, I employ gasoline as a fuel for the purpose of starting my engine, and as soon as the same has been slightly warmed I switch to an oil commonly known as stove-oil and I have found from actual experience that my engine will run upon stove-oil in a much more efficient manner and with the consequent reduced cost of operation.

It is to be understood that the form of my invention herewith shown and described is to be taken as a preferred example of the same and that various changes relative to the material, size, shape and arrangement of parts may be resorted to without departing from the spirit of the invention, or the scope of the subjoined claim.

Having thus described my invention, I claim:—

A carburetor for a combustion engine, embodying in its construction a manifold communicating with said engine, a spray nozzle mounted in said manifold and capable of injecting atomized fuel directly to the engine, said nozzle having a bell-shaped extension surrounding the same, the wall of said bell-shaped member being curved and provided with slots whereby induced air passing through said slots will rotate about the spray issuing from said spray nozzle, the flared extremity of said bell-shaped extension being spaced from the passageway of said manifold to said engine.

PAUL L. JOSLYN.